(12) United States Patent
Hughes et al.

(10) Patent No.: US 6,183,831 B1
(45) Date of Patent: Feb. 6, 2001

(54) HARD DISK VAPOR LUBE

(75) Inventors: John L. Hughes, Rodeo; Benjamin M. DeKoven, San Jose; Richard E. Lavine, Sunnyvale, all of CA (US)

(73) Assignee: Intevac, Inc., Santa Clara, CA (US)

( * ) Notice: Under 35 U.S.C. 154(b), the term of this patent shall be extended for 0 days.

(21) Appl. No.: 09/137,361

(22) Filed: Aug. 20, 1998

(51) Int. Cl.[7] ...................................................... G11B 5/66
(52) U.S. Cl. ...................... 428/65.3; 428/65.4; 428/65.5; 428/692; 428/694 T; 428/694 TS; 428/694 R; 428/900; 427/128; 427/129; 427/130; 414/225; 414/222; 414/217; 414/416; 414/417; 414/403; 414/404; 204/298.25; 204/298.26
(58) Field of Search ........................... 428/694 T, 694 TS, 428/694 R, 692, 65.5, 65.3, 65.4; 427/128–130; 204/298.25, 298.26; 414/225, 222, 217, 416, 417, 403, 404

(56) References Cited

U.S. PATENT DOCUMENTS

| | | | |
|---|---|---|---|
| 4,260,466 | 4/1981 | Shirahata et al. | 204/192.2 |
| 4,501,801 | 2/1985 | Kimura et al. | 428/447 |
| 4,882,197 | * 11/1989 | Matsudaira . | |
| 4,920,919 | * 5/1990 | Matsudaira . | |
| 4,960,609 | 10/1990 | Homola et al. | 427/490 |
| 5,049,410 | 9/1991 | Johary et al. | 427/131 |
| 5,215,420 | 6/1993 | Hughes et al. | 414/217 |
| 5,232,503 | 8/1993 | Lewis | 118/421 |
| 5,331,487 | 7/1994 | Gregory et al. | 360/97.02 |
| 5,520,981 | 5/1996 | Yang et al. | 428/65.5 |
| 5,545,478 | 8/1996 | Lin et al. | 428/332 |
| 5,562,965 | 10/1996 | Gui et al. | 428/65.4 |
| 5,631,081 | 5/1997 | Lin et al. | 428/332 |
| 5,677,051 | 10/1997 | Ueda et al. | 428/336 |
| 5,776,577 | 7/1998 | Yanagisawa | 428/65.4 |

OTHER PUBLICATIONS

Article by Gordon Knight, Data Storage, Feb. 1998 (vol. 5, No. 2) pp. 23–30.

Article by Joseph Davis, Data Storage, Feb. 1998 (vol. 5, No. 2) pp. 33–36.

Vapor Lubricants of Thin Film Disks. IEEE Transactions on Magnetics vol. 30 No. 6 Nov. 1994.

Tailoring performance properties of perfluoroethers via Supercritical fluid fractionation Proceedings of the 3rd international symposium on Supercritical Fluids.

Measurement of Interfacial Processes at Electrode Surfaces with the Electromechanical Quartz Crystal Microbalance Chem Rev. 1992, 92, 1355–1379.

Molecular Tribology of Disk Drives, Tribology Letters (1998) 119–123.

The Interaction of Perfluoro–Polyether Lubricant with Hydronenated Carbon. IEEE Transactions of Magnetics vol. 32, No. 5 Sep. 1996.

Interfacial Chemistry of a Perfluoropolyether Lubricant Studied by X–Ray Photoelectron Spectroscopy and Temperature Desorption Spectroscopy. J. Va. Sci. Technol. A 11 (2) 93.

* cited by examiner

Primary Examiner—Leszek Kiliman
(74) Attorney, Agent, or Firm—Stanley Z Cole

(57) ABSTRACT

Disclosed is a system for transporting disks in vacuum to a vacuum station whereat a lubricant film is applied uniformly to the surfaces of the disks by evaporation. Thickness uniformity is achieved by directing the evaporate through a multi-hole aperture plate. Described is equipment for manufacture, the process of manufacture and the novel disks created.

20 Claims, 6 Drawing Sheets

HARD DISK VAPOR LUBE

This invention was made with the United States Government support under cooperative agreement number 70NANB7H3053 awarded by NIST. The United States Government has certain rights in the invention.

FIELD OF THE INVENTION

This invention relates to an apparatus and a method for maintaining a pristine surface of magnetic, optic, and/or magneto-optic disks and depositing on such pristine surfaces a thin uniform film of lubricant to minimize friction or "stiction". It also relates to an improved disk with an improved lubricant film across its surface(s).

BACKGROUND OF THE INVENTION

Several types of computer memory have in common the feature that they utilize "hard" disks which are comprised of a base or substrate material, such as aluminum, glass, plastic or ceramic, upon which are thin layers of various material including materials which are magnetic or optically active, plus layers of materials which protect the active layer(s) from corrosion, or mechanical damage. Such magnetic, optical or magneto-optical disks may also be referred to as media. An example of such media is the magnetic disks which are used in hard disk drives.

In typical applications a thin polished or textured aluminum disk is used as the substrate. Various thin films are deposited by vacuum sputtering upon this substrate. Typically an underlayer or underlayers 200 to 1000 Angstroms (Å) thick is first deposited, then a magnetic layer, 100 to 600 Å thick is deposited over this underlayer and then a protective thin layer is deposited over the magnetic layer. This protective layer is typically 50 to 150 Å of carbon.

The carbon layer serves several important functions. It protects the magnetic layer against corrosion damage from water vapor or other atmospheric contaminants. It also protects the magnetic layer from mechanical damage, which could occur as a result of contact of the disk with the magnetic read-write head. The head normally "flies" above, but very close to, the surface of the disk. However, when the drive is not in operation the head may rest on the disk, or it may contact the disk inadvertently as a result of shock, vibration or malfunction when the drive is operating. To obtain maximum magnetic signal strength it is desirable to "fly" the head as close as possible to the magnetic layer. Spacing of 1 micro-inch (250 Å) or less is typical in current drives. Such close spacing can result in relatively frequent contacts between the head and the disk, and is sometimes referred to as semi-contact recording. If frictional forces are high, such contacts can destroy parts of the disk surface.

Both the disk surface and the head have relatively flat, smooth surfaces. As a result, there can be substantial friction between them when they are in contact. This is particularly significant when the head has been resting for some time against the disk. In this case the starting friction or "stiction" between the head and the disk can be so great that the motor seeking to start the disk rotating could have insufficient force to do so, or if it does, the carbon protective coating of the disk may be damaged in the process.

To minimize these problems, disk manufacturers typically apply a thin (10–15 Å) film of a lubricant over the carbon topcoat. The commonly used method of applying the lubricant is described in U.S. Pat. No. 5,232,503 and is as follows:

1. After a carbon topcoat is applied in the vacuum sputtering system, the disks are loaded in a cassette, which typically holds 25 such disks. The cassettes exit the vacuum system into atmosphere.

1. The cassettes then proceed to the lubricant system where, typically, the disks are removed from the cassette as a batch and lowered into a tank containing a mixture of lubricant and solvent. This mixture is then withdrawn from the tank in a controlled manner to leave a uniform thin coating of lubricant on the disks.

2. The lubricant-coated disks are returned to cassettes where they proceed to further processing and/or testing.

In addition to being very thin (10 to 15 Å) and very uniform (to within 2 Å), the lubricant layer must satisfy a number of requirements. Obviously, it must be adequately lubricious to reduce friction and stiction between the head and the disk. It must also bond sufficiently well to the carbon layer to resist evaporation and the centrifugal forces generated by the disk, which rotates at speeds up to 10,000 rpm, so that it remains largely in place and is not spun off. At the same time it must be able to flow somewhat so as to be able to recoat areas of the disk where the lubricant may have been displaced as a result of contact with the head.

Obviously, achieving the proper balance between fixity and mobility is difficult and requires careful control of the properties of the lubricant and of the process for applying it. At present, a difficulty arises since the fresh carbon surface is reactive and begins to contaminate as soon as it is exposed to atmosphere. This leads to varying times of such exposure, since the lubrication process systems handle disks in the batch mode. The lubricant, which is designed to bond to the surface, does so non-uniformly since the contaminated surface is not uniform and surface contamination increases as the disks remain exposed to atmosphere. Such contamination makes it difficult to keep the lubrication process under control, which in turn affects disk drive reliability. Also solvents present and used in the gravity lube process are considered air pollutants, requiring that the present lubrication systems be built with elaborate and expensive means to minimize solvent escape.

Although the construction of optical and magneto-optical disks is not the same as conventional magnetic hard disks, they also have the characteristic that the head flies very close to the disk surface and therefore occasional head-disk contact occurs. To minimize potential damage to both the head and the disk a top lubrication layer is frequently used on such disks also, with similar problems of process and environmental control.

Disks are manufactured at a reasonably rapid rate using serial feed and processing. Yet most of the current processes for lubricating disks use batch processing. Manufacturing processes combining serial and batch processing, although possible, make disk production most complex. The instant invention permits continuous serial feed as to simplify manufacturing techniques.

SUMMARY OF THE INVENTION

In one aspect the invention involves an improved disk with a lubricant bonded to its surface made in accordance with the novel processes of this invention.

In another, a novel process to make magnetic disks including a surface lubricant is described. More particularly, it is now understood that the carbon deposited in a vacuum to create a protective covering layer on the magnetic underlayer of the disk is highly reactive. It is now also understood that if such a surface is exposed to ambient conditions, reactions occurring with the deposited carbon contaminate this surface. This impacts qualities desired in the surface. In a third, a novel apparatus is described for the treatment of disks according to this invention.

It is also understood that depositing a lubricant material on this reactive protective coating prior to its contamination by exposure to atmosphere causes bonding of the lubricant to the reactive carbon creating a very thin but bound coating of the lubricant material on the carbon coating. In any event, we believe that the lubricant will adhere more tenaciously and more uniformly to a fresh, uncontaminated carbon base layer and will not readily vaporize. In carrying out the process of this invention the lubricant material is used without dilution and is vacuum deposited on the support surface without breaking the vacuum used during deposition of the protective layer. It has been found that lubricant deposited this way forms a uniform surface layer which is adequately bound to its support base yet appears to self heal damaged or depleted areas.

Using the techniques and apparatus of this invention, it is possible to coat disks with lubricant using evaporative processes at a rapid speed of from about 550 to more than 1000 disks per hour, so that the disk lubricating process is matched to prior film deposition steps and full production throughput is maintained using only serial process steps.

DETAILED DESCRIPTION OF THE INVENTION

Figure 1:
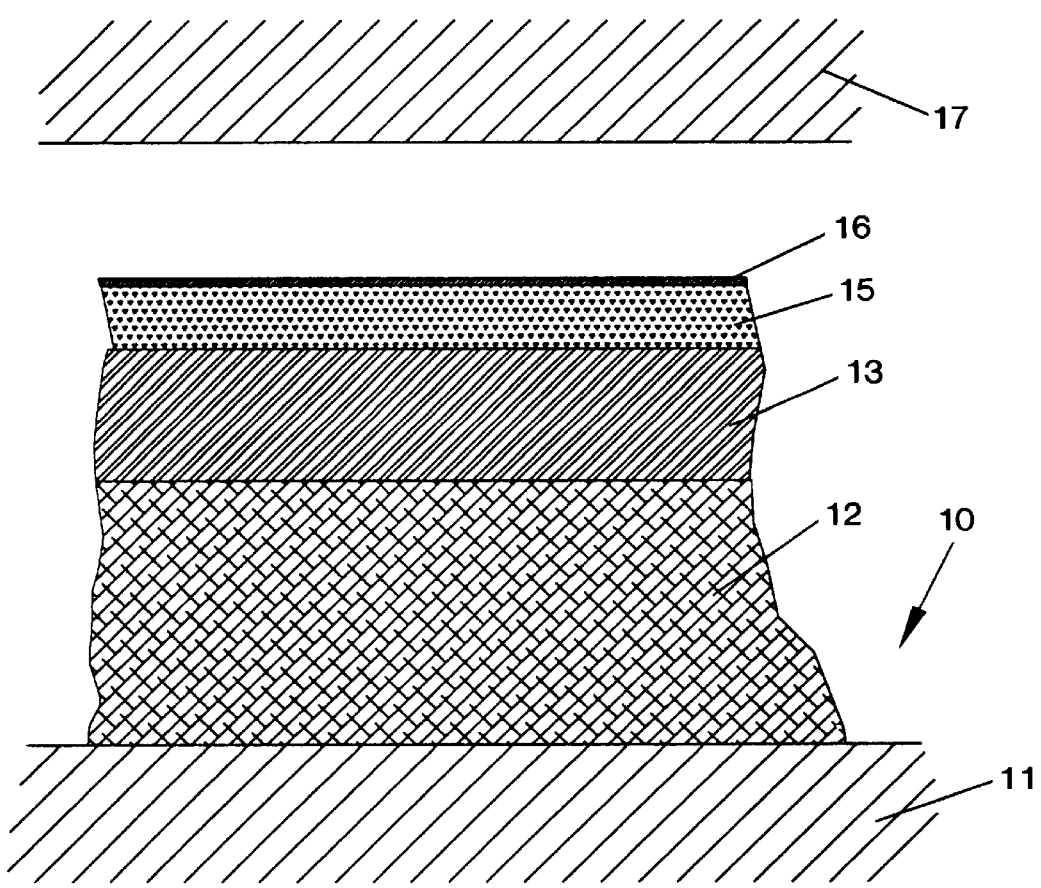
FIG. 1 is a partial sectional view of a typical magnetic disk showing deposited layers in position relative to a read-write head.

As illustrated in FIG. 1, only the upper half of the magnetic disk 10 is shown. It should be understood that a magnetic hard disk comprises a base 11 of aluminum or other material which is coated on both sides and is used to store data on each surface. However, in FIG. 1 only one side of the disk is illustrated. In the manufacture of disks for portable or laptop computers, a material which can be lighter and/or more rigid than aluminum is sometimes used instead of the aluminum base.

Further the coating of a preferred disk is described but it should be understood that various coatings may be used and that the selection of coating layers and thicknesses is dependent on the equipment in which the disk is to be used as well as its function in such equipment. More particularly as shown in FIG. 1, a chromium layer 12 overlies substrate layer 11. In the embodiment shown this chromium layer 12 is approximately 300 to 500 Å thick. Such thicknesses are typical for the manufacture of hard disks for computers. For special purpose computers or for unique other products, the substrate may be overcoated with other materials and/or different thicknesses. On top of the chromium there is deposited a magnetic layer 13. This may be, for example, a cobalt alloy layer. Typically, this layer will be from about 250 Å to about 1,000 Å in thickness. On this layer there is deposited a carbon overcoating layer 15 which may comprise a layer having a thickness of from about 20 to about 150 Å. In this illustration there is also shown a lubricating layer 16 which typically has a thickness of about 15 Å and generally is in the range of about 5 to about 20 Å.

Separated from the disk is head 17. This may be the typical read-write head used in computer disk drives. In such a case, when the system is at rest, the head generally rests directly on the surface of disk 10. However, when head 17 is flying, as when the disk is rotating, it is typically spaced about 1 micro-inch or about 254 Å from the surface of disk 10.

Magnetic disks, as illustrated, may, in part, be manufactured in equipment such as that sold by Intevac, Inc. located in Santa Clara, Calif. The equipment is marketed as the MDP 250B Magnetic Disk Coater and generally conforms to the equipment described and disclosed in U.S. Pat. No. 5,215,420. Machines of this type are in use at known disk manufacturers such as Seagate, HMT, etc., throughout the world.

Figure 2:
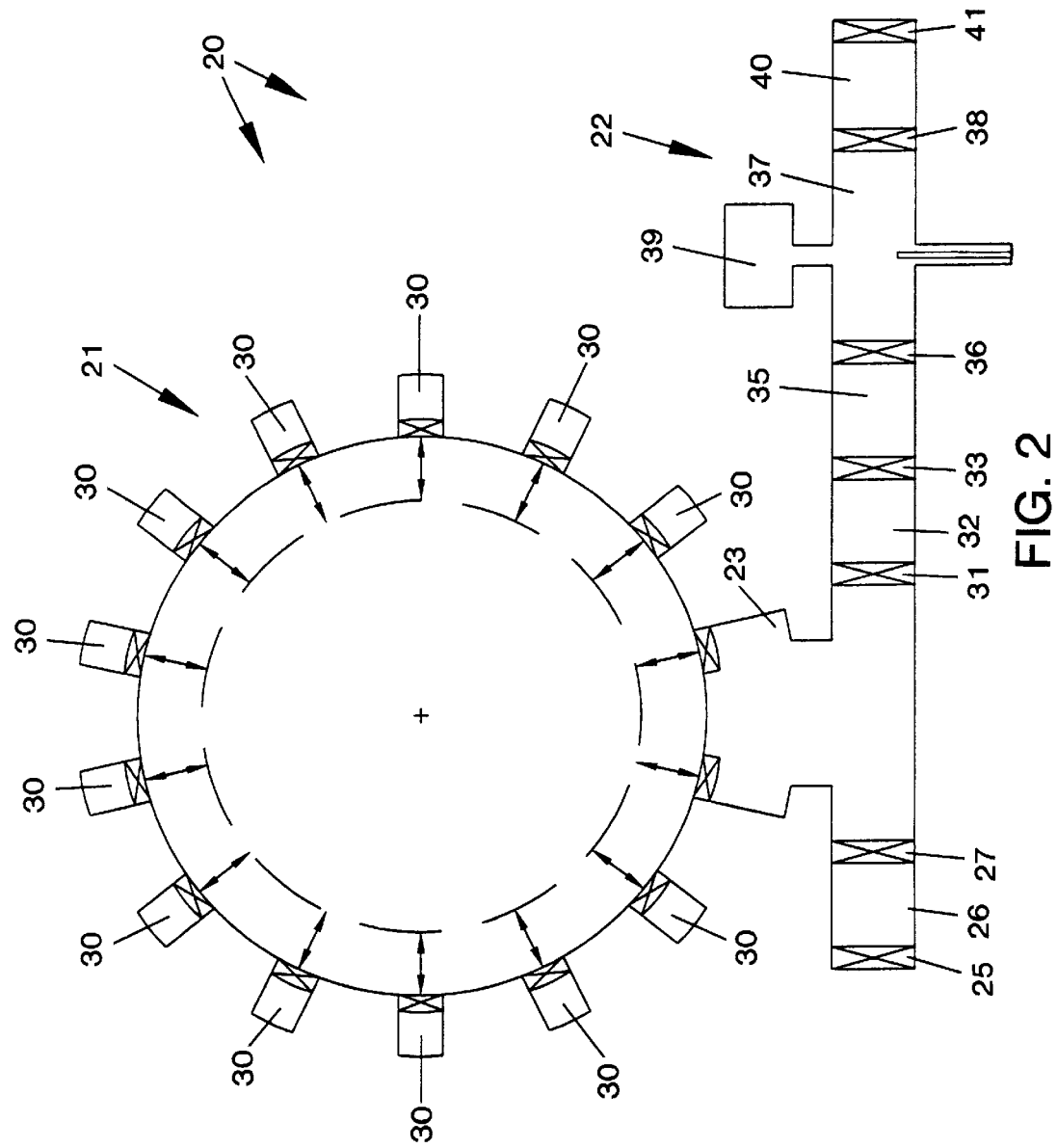
FIG. 2 is a schematic view of a disk lube unit attached to a disk coater to permit magnetic disk manufacture, followed by the deposition of a lubricant, in which the disk is maintained in vacuum through the various thin film deposition steps until after deposition of the lubricant layer.

Referring now to FIG. 2, there is illustrated apparatus 20 which may be employed as a production coater for both the functional and lubrication coatings. At the upper section of this figure and designated 21 there is generally shown a disk coating system for depositing the various base or underlayers and the magnetic layers. This may comprise equipment as described in U.S. Pat. No. 5,215,420 or like equipment for the same purpose. At the lower section and generally designated 22, there is illustrated a disk lube section. The disk lube section is illustrated in greater detail in FIG. 3. (The same numbers are used to designate the same item.) These two main sections of the production deposition and lubrication coater are joined through a transfer lock 35. The disk coating system 21 is maintained under vacuum with each station 30 along the central chamber having independent sealing systems as to create independently controlled vacuums at each station. This permits movement of articles to be treated around the central chamber in a vacuum environment and transfer of such articles to one or more processing stations. At a processing station, for example for sputter deposition, vacuum conditions are also required.

In the equipment of FIG. 2, there are shown twelve processing chambers 30. Independently controlled chambers permit the separate processing of articles simultaneously in different processing chambers and processing of articles in different ways in different processing chambers simultaneously.

In normal operation, a cassette of blanks or substrates enters the apparatus at the lower left hand corner in this illustration through entrance gate 25. The cassette then moves through load lock 26 and post load lock gate 27. In the coating system buffer lock 23, the articles or disk substrates are unloaded from the cassette onto lift blades, as is described in U.S. Pat. No. 5,215,420, which transport the substrates into the apparatus for processing. The lift blade feeds the disk to the main chamber 21 and from the main chamber into a processing chamber 30 for processing. Processing may comprise any number of deposition or other process steps including the sputtering of a chromium layer after which the article may be moved to another processing chamber where a cobalt alloy for example may be placed on the surface of the disk. After that the deposition of a carbon or other protective layer takes place in another processing chamber. The carbon or other protective layer may be deposited using sputtering technology or alternatively, for example, using a process of chemical vapor deposition as is described in recently filed U.S. pending patent application in the name of Bluck et al., Ser. No. 09/076,971 filed on May 13, 1998 now abandoned. A blade with a disk seated thereon lowers the disk back into an empty position of the cassette in buffer lock 23. Disks in cassettes then move into the disk lube segment of the equipment. First they pass through unload gate 31 and then through unload lock 32.

Figure 3:
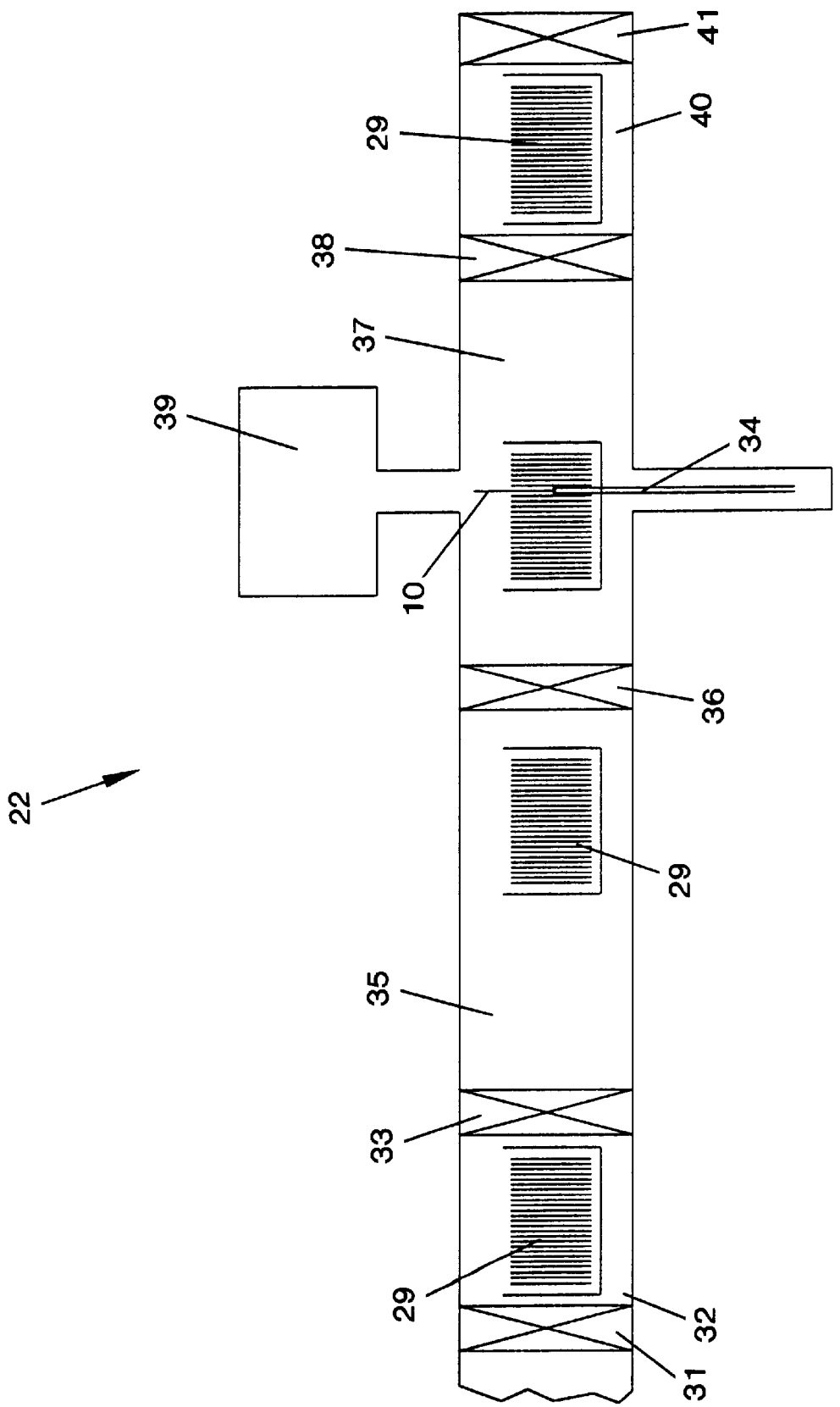
FIG. 3 is schematic of the lubrication section of the disk coater illustrated in FIG. 2.

To facilitate understanding, FIG. 3 shows the lube section in an enlarged drawing. The cassette transfers through exit gate 33 and enters transfer lock 35 after which it enters vacuum lube main chamber 37 through transfer gate 36. The disk is raised out of the cassette with a lift blade 34 of the type, for example, as is used to raise a disk for processing in the main chamber 21 and for coating with a lubricant in vacuum lube process chamber 39 as will be described hereafter in connection with FIG. 4, and then the disk after lubing is placed back into a the same cassette in the vacuum lube chamber and transported out of the apparatus at exit 41 after passing through unload gate 38 and unload lock 40. Disks are maintained under vacuum conditions as they travel from the main chamber 21 or from a processing chamber 30 at the main chamber 21 to and through vacuum lube chamber 39.

The disk is coated with a thin uniform coating of a lubricant by vacuum evaporation in the vacuum lube process chamber 39. In this system evaporation occurs in vacuum onto freshly deposited carbon which has not been exposed to atmosphere. This is believed critical to the success of the process. It is known that carbon which has been freshly deposited by sputtering, chemical vapor deposition, or other deposition process, and which has not been exposed to atmosphere is highly reactive. As has been described, exposing such a surface to atmosphere-, results in contamination of the surface, which would impact the quality and uniformity of any deposited lubricant layer. Evaporation of a lubricant onto such a carbon surface before exposure to atmosphere appears to bring about a chemical bonding between the carbon and the deposited lubricant which, it is presently thought, may create a unique bond to facilitate the results achieved in this invention.

Figure 4:
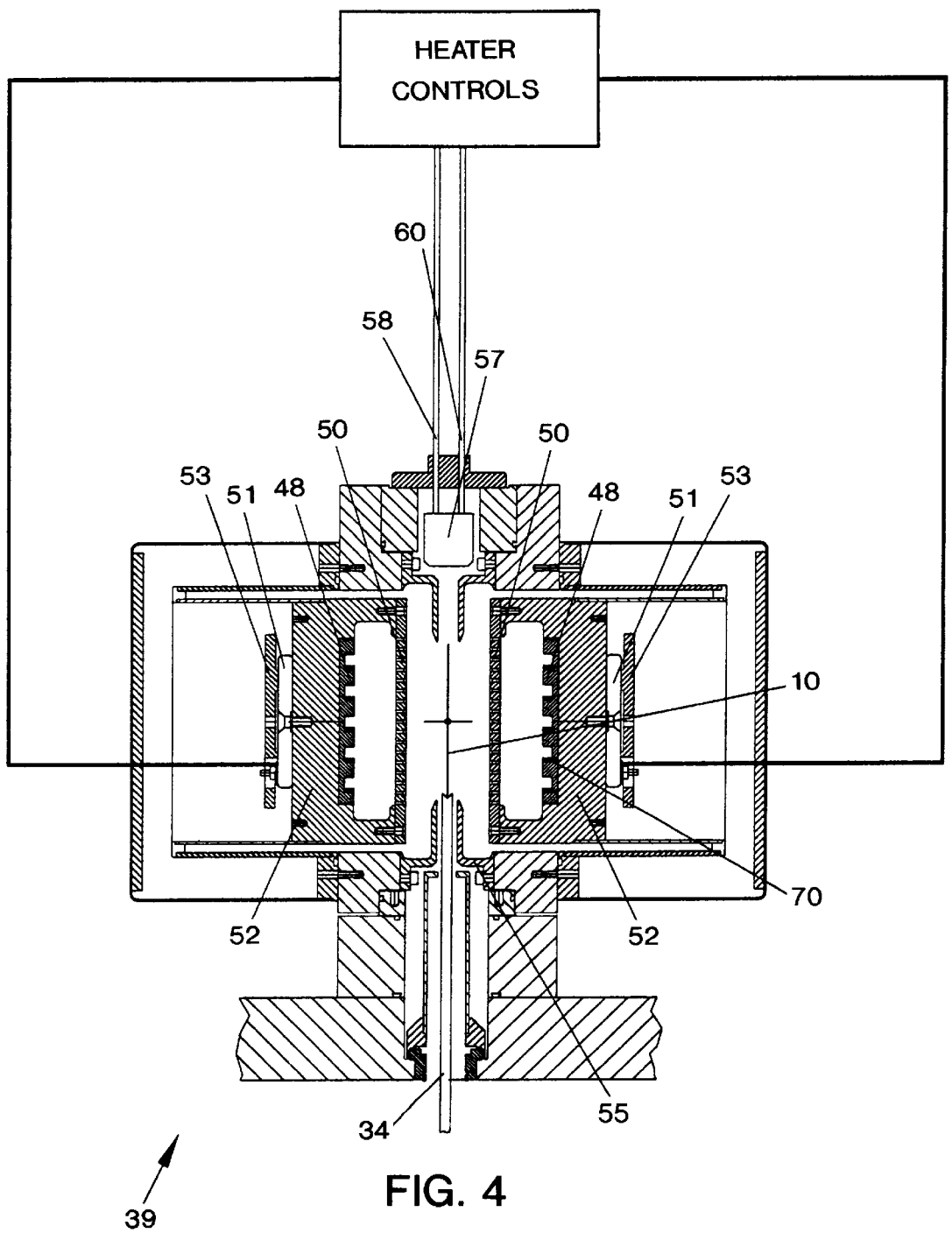
FIG. 4 is an illustrative drawing of the vapor deposition station of the lubrication section of FIG. 3 at which a lubricant is deposited on a disk.

FIG. 4 illustrates a lubricant processing station 39 in accordance with this invention. Carrying blade 34 lifts disks 10 out of cassettes in the vacuum lube main chamber. While supported by the carrying blade, the disk is moved to the lubricant evaporation station 39. This station comprises two evaporator plates 48 each facing the opposite side of the disk surface. Each evaporator plate 48 has troughs 70 to carry lubricant to be evaporated. Positioned between the evaporator plates 48 and the disk 10 are diffusers plates 50, each comprising a plate with holes throughout to control deposition uniformity of the evaporating lubricant being deposited onto the surface of disk 10. A disk 10 is illustrated in position between the two diffuser plates 50 of the evaporators. The evaporator includes a heater 51 adjacent to heating block 52 of copper or a like heat holding and transfer material which backs against evaporator plate 48. The heater and heater clamp plate 53 in this embodiment are open to air.

Positioned at the top of this processing station is a deposition thickness measuring device 57. This may comprise a quartz crystal microbalance (QCM), an instrument known to the art, which is used in this invention to monitor lubricant deposition rates in vacuum. Although a QCM will be discussed in connection with the disclosure of the instant invention and is a preferred structure for the apparatus disclosed, other like instrumentality or instrument arrangements capable of performing sensitive measurements of small amounts (0.1 Å/second) of liquid lubricants in vacuum may be used in place of the QCM described. A QCM can be used to monitor thickness changes of the order of a monolayer which is a key reason for its use in this instance. A pair of QCM's are installed, each able to measure deposition from its respective side. The resonant frequency for each QCM is sensitive to mass changes of lubricant deposited on the quartz crystal. The change in resonant frequency is typically 1.5 Hz/Å of deposited lubricant. The build-up of lube thickness on the crystal is proportional to the amount of lube that is deposited on the disks.

The QCM is connected in feedback loop 58 and 60 to maintain a specified deposition rate of lubricant in the lubricant processing station as shown in FIG. 4. In this way, the temperature of the heater can be controlled to in turn control the rate of lubricant evaporation. This arrangement permits control of lube thickness uniformity from disk to disk based on variations within the system. For example, if the molecular weight or physical composition of the lubricant reservoir varies over time due, for example, to evaporation, this would normally result in a change in lubricant deposition rate over time. To maintain a constant deposition rate, this change in lubricant deposition rate will be fed back to change the temperature at the heater. This will change the rate of evaporation to assure that the deposition rate is maintained constant. Alternatively if the QCM determines that the desired thickness has been reached, further deposition onto the disk can be stopped by closing shutters (not shown) between the diffuser plate and the disk surfaces.

Although the preferred deposition process has been described, it is also possible to use flash evaporation processes to deposit lubricant. Flash evaporation has the advantage of preventing selective evaporation of lower molecular weights of the lubricant. In this case, a measured amount varying between 12 to 25 micrograms is delivered to a flash evaporator in vacuum and evaporation takes place. This would result in a deposited thickness of 10 to 20 Å on each side of the disk. This process permits the use of a diffuser plate which is uniform in permitting lubricant to diffuse through to the disk as to facilitate the deposition of a uniform layer thereon.

The lubricant used in the instant process is preferably a perfluoropolyether (PFPE). Such material and its chemical composition has been described as a lubricant for magnetic disks in U.S. Pat. No. 5,776,577. The disclosure of this lubricant in this patent is incorporated herein by reference.

The prior art techniques which used such materials generally diluted the lubricant in a solvent typically using 1.5 grams of the lubricant per liter of solvent. The perfluoropolyether lubricants are available as trade named products using names such as Fomblin Z-fluids (Montedison); Demnum (Daikin) and Krytox (Dupont). Commercially available PFPE lubricants can have a wide range of vapor pressure and molecular weights.

In the practice of this invention Z-DOL 2000 perfluoropolyether is used in an undiluted condition. The undiluted fluid has been fractionated by supercritical fluid fractionation, as is known in the art, prior to use in the lubricant evaporator. The fractionation provides for better control of Z-DOL evaporation processes. Phasex Corporation, has applied this technology towards the purification of Fomblin materials using carbon dioxide. If the fractionated Z-DOL continues to fractionate during evaporation which could change the deposition rate, then this can be compensated using the QCM with temperature feedback as previously described. The Z-DOL lubricant is deposited onto the disk using a lubricant vapor pressure of approximately $8 \times 10^{-4}$ Torr with control of the delivery temperatures between 50° C. to 100° C. (maintained to ±0.25° C). This will keep the deposition rate constant, due to change in the physical composition of the ZDOL as it evaporates from the reservoir. The deposition rate in this case is about 15 Å of lubricant within about 3 seconds to produce a uniform lubricant film (±2 Å) across a hard disk media surface having a diameter of about 95 mm. At this rate one can coat over 1000 disks in about an hours time.

Other undiluted fluids can be used. Based on the vapor pressures of the various commercially available lubricants, the following temperatures are required to maintain the deposition rate of 5 A per second: Z-25@300° C.; AM3001@170° C.; X-1P @150° C.; AM2001@100°; and Z-DOL @50° C. The required temperatures are within the operation limits based on information received from suppliers. Other lubricants may be evaporated in vacuum provided the heat of vaporization is between 5–100 kilocalories per mole of lubricant.

Figure 5:
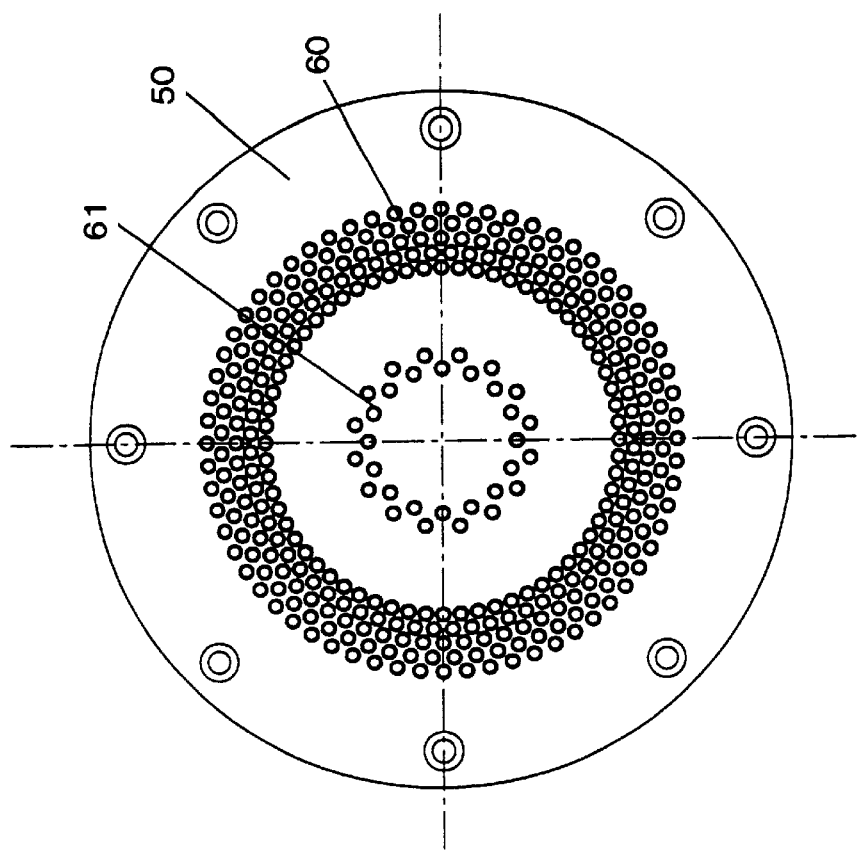
FIG. 5 is a showing of a diffuser plate with a symmetrical hole pattern, used on the vapor deposition station of FIG. 4.
Figure 6:
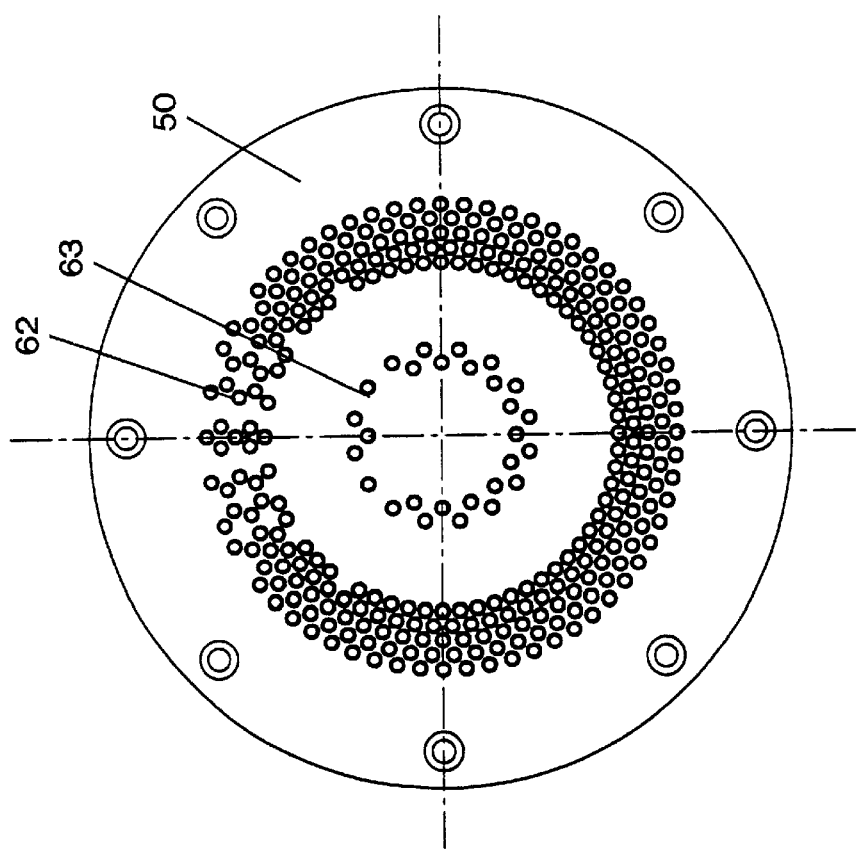
FIG. 6 is another diffuser plate, in this case with an asymmetric hole pattern.

Referring now to FIGS. 5 and 6, there are shown two diffuser plates. These are used to deposit the desired lubricant thickness uniformity on the disk surface. In FIG. 5 the hole pattern of the plate is symmetrical; whereas, the hole pattern of the plate in FIG. 6 is asymmetrical. Referring to these figures, a diffuser plate 50, which may comprise a metallic member has 2 sets of holes. The outer set 60 and the inner set 61 are symmetrically placed in FIG. 5. This type diffuser plate operates to create a uniform deposition if flash evaporation is used. An asymmetric diffuser plate as shown in FIG. 6 permits movement of the disk at a constant speed to result in uniform deposition of lubricant on its surface. The asymmetric diffuser plate is used if the movement of the disk is so controlled as to compensate for a non-uniform deposition which would result in the evaporator as the disk is moved upward into position and then downward out of the evaporator, all while evaporation was taking place. In FIG. 6 the support plate is again designated 50 and the inner holes are designated 63 and the outer ones 62.

A model for the diffuser plate for lubricant deposition was developed. The model is based on that described by D. Kuhl and R. Tobin [Rev. Sci. Instrum. 66, p. 3016 (1995)] for capillary and effusive gas dosing. The model is uniquely adapted to estimate the lubricant flux per unit area on the disk using rings of holes. All geometric parameters such as diffuser plate to disk distance, radius of rings of holes, hole diameters, and diffuser plate thickness for capillary dosing are used as variables for the calculations. Based on the actual data using the diffuser plate, there is excellent agreement with the model using the capillary dosing model. From these calculations, the lubricant uniformity can be controlled to provide any degree of radial symmetry desired.

Figure 7:
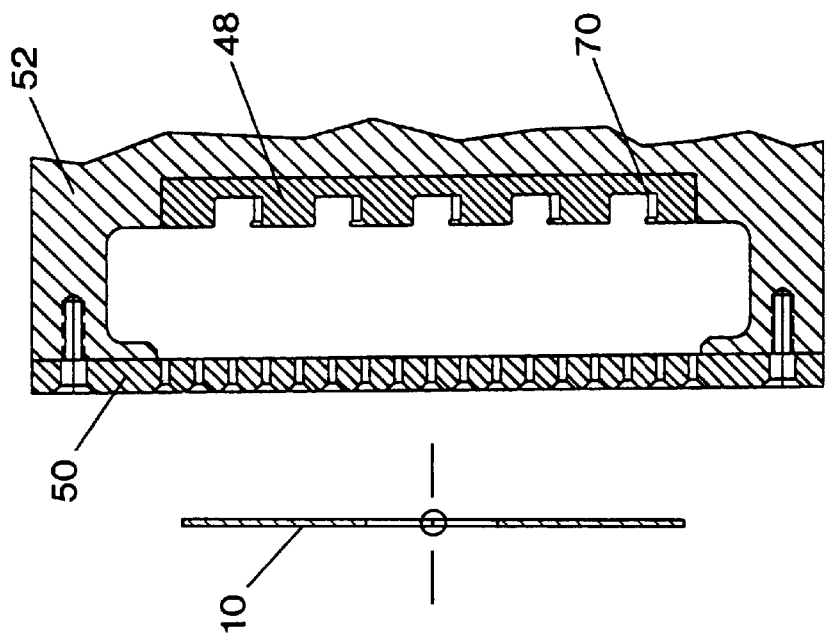
FIG. 7 is side view showing of an evaporator plate for a vapor deposition station as illustrated in FIG. 4.
Figure 8:
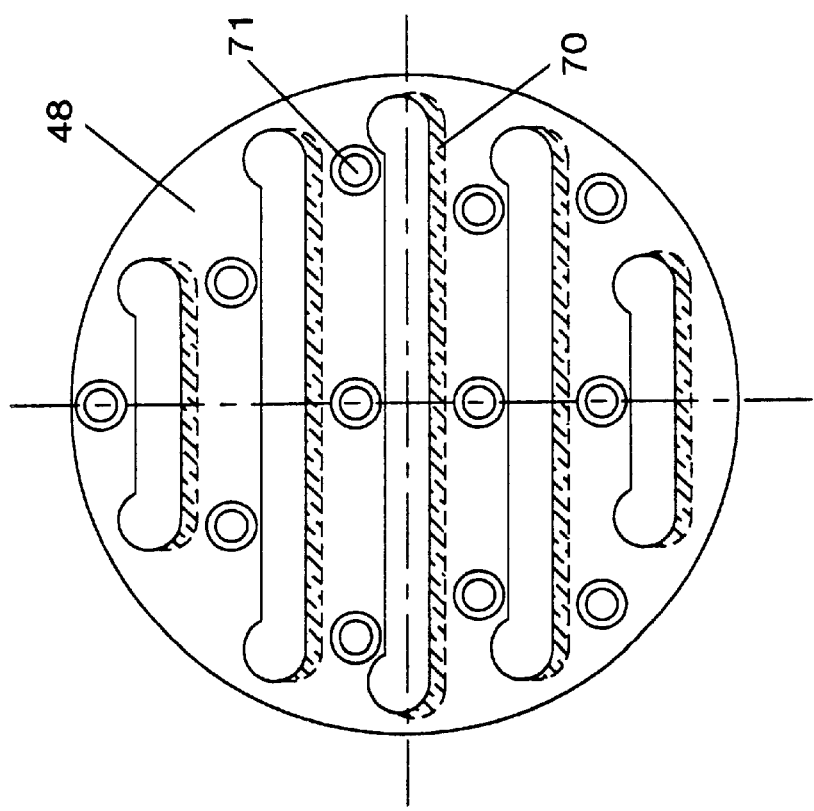
FIG. 8 is a front view of the evaporator plate of FIG. 7.

Referring now to FIGS. 7 and 8 where an evaporator plate is shown in two different views. In FIG. 7 the evaporator plate is shown in a side view and in FIG. 8 the evaporator plate is shown in a front view. In FIG. 7 a disk 10 is shown in position for evaporation. The lubricant may be continuously evaporated or evaporated in a controlled manner as for example starting as a disk enters the chamber and stopping when it has departed. Lubricant to be evaporated is placed into the troughs 70 on the face of evaporator plate 48 prior to operation in vacuum. Each of the five troughs (~5 cm³ total volume) is filled in atmosphere using a micropipette. The lubricant volume should be sufficient for 20–30 days coating at 1000 disks per hour. The diffuser plate 50, which may for example be of the type shown in FIG. 5 or FIG. 6 depending on how the system is being run and depending on the coating desired, permits the evaporated lubricant to pass through the holes (shown in FIGS. 5 and 6) for deposition onto disk 10. Heating block 52 maintains uniform temperature at the evaporator plate and diffuser plate 50.

It should be understood that the disclosure has been made in terms of a preferred embodiment and that numerous changes in details of construction or arrangement of parts or steps may be made without departing from the spirit and/or scope of the invention. Among other things, the emphasis in this description has been the making of magnetic disks for computer hard disk usage. In fact in making optical media it is the practice to protect the surface by depositing a silicon nitride coating in lieu of the carbon coating used on magnetic media. In fact such a surface deposition is also subject to problems similar to those encountered with magnetic media. Silicon nitride is extremely reactive if coated in a vacuum. If then removed to atmosphere one would expect a deposit on an irregular basis of contaminants and it is for this reason that such a surface should also be coated in a vacuum with a lubricant layer in accordance with the teachings of this invention. In any event it is intended that changes obvious to those skilled in this art be encompassed by the appended claims.

What is claimed is:

1. The process of making a lubricated hard disk comprising sequentially
   (a), coating a substrate with an underlayer of magnetic material in a vacuum enclosure;
   (b), coating in said vacuum enclosure a protective coating onto said underlayer;
   (c), transporting said substrate through a vacuum tight isolation chamber between said vacuum enclosure and a vacuum tight lubrication process chamber such that said vacuum enclosure is fluidly insulated by said isolation chamber on a continuous basis from said lubrication chamber; and,
   (d), coating said substrate in said lubricating process chamber with a lubricating layer onto said protective coating, said substrate being maintained in a vacuum atmosphere throughout steps (a) through (d).

2. The process of claim 1 in which said lubricating layer is coated onto said protective coating using lubricant evaporation.

3. The process of claim 1 in which said protective coating is a carbon layer.

4. The process of claim 1 in which said protective layer is silicon nitride.

5. The process of claim 3 in which the carbon layer is deposited by sputtering.

6. The process of claim 3 in which the carbon layer is deposited by chemical vapor deposition.

7. The process of claim 1 in which said substrate comprises aluminum and in which said lubricating layer comprises a vapor deposited lubricant.

8. Apparatus to make lubricated hard disks comprising:
   deposition equipment to coat substrates with underlying active layers with a protective layer deposited thereon in a vacuum chamber;
   a vacuum tight isolation chamber between said deposition equipment and a vacuum tight lubrication process chamber such that said vacuum chamber is fluidly insulated on a continuous basis by said isolation chamber from the lubrication process chamber;

a lubrication process chamber in which a lubricant layer is evaporated onto the surface of the protective layer on said substrate: and transport means to sequentially transport a substrate from said vacuum chamber to and through said isolation chamber and to and through said lubrication process chamber whereat a lubricating layer is deposited onto the surface of the protective layer in said lubricating process chamber while transporting the substrate therethrough.

9. Apparatus in accordance with claim 8 in which said thin lubricating layer deposited on said protective layer is deposited from a vacuum evaporation station using an undiluted material.

10. Apparatus in accordance with claim 8 in which said apparatus to deposit a thin and uniform lubricating layer includes means to move a cassette including disks having outer carbon protective layers into a vacuum lube station, means at said station to lift a disk from a cassette into a processing section including a lubricant evaporator to vapor deposit lubricant uniformly on each side of the disk, and means to lower the disk into the cassette and to move the disk in the cassette out of the apparatus.

11. Apparatus in accordance with claim 10 in which the lubricant in vaporized form passes through diffuser plates positioned and disposed on each side of said disk positioned in said processing section.

12. The apparatus of claim 11 in which the diffuser plates have hole patterns to assure a uniform deposition of lubricant passing therethrough to said disks.

13. Apparatus in accordance with claim 8 in which the apparatus to coat substrates with underlying active layers and with a protective layer deposited thereon in a vacuum includes sputtering equipment to deposit magnetic film as said underlying active layer and sputtering equipment to deposit a protective carbon coatings on said magnetic media and a vacuum evaporation station thereafter at which a thin and uniform lubricating layer is deposited onto said protective layer.

14. Apparatus in accordance with claim 8 in which the apparatus to coat substrates having underlying active layers with a protective layer deposited thereon in a vacuum includes sputtering equipment to deposit optically active films as said underlying active layer and sputtering equipment to deposit protective coatings on said optically active films.

15. The process of claim 2 in which the lubricant is flash evaporated onto said protective coating.

16. A lubricated disk for hard disk applications comprising a disk including a substrate, data recording coatings on the surface of said substrate deposited in a vacuum chamber, a protective layer on said data recording coating deposited thereon in a said vacuum chamber, and a deposited evaporated lubricant layer on the surface of the protective layer deposited on said protective layer in an isolated chamber after passage of the substrate through a vacuum isolation region which insulates the surface of the protective layer from exposure to processes performed on the substrate in the vacuum chamber and insulates the vacuum chamber from the process of depositing a lubricant onto the protective layer without exposure of the disk after deposition of said protective layer to atmosphere or reactive gases before deposition of the lubricant layer.

17. A disk in accordance with claim 16 in which the data recording coating comprises a layer of magnetic.

18. A disk in accordance with claim 16 in which the protective coating comprises a silicon nitride layer.

19. Apparatus in accordance with claim 10 in which the rate of deposition of the lubricant onto the disk is constantly measured and controlled through a feedback loop.

20. Apparatus in accordance with claim 19 in which apparatus within the feedback loop measures deposition in the lubricant deposition chamber and controls the rate of deposition by controlling the heat applied to the evaporator.

* * * * *